(12) United States Patent
Rosen et al.

(10) Patent No.: US 7,324,823 B1
(45) Date of Patent: Jan. 29, 2008

(54) SYSTEM AND METHOD FOR SELECTIVELY TRANSFERRING WIRELESS CALLER LOCATION INFORMATION

(75) Inventors: Kenneth H. Rosen, Middletown, NJ (US); John A. Rotondo, Murray Hill, NJ (US)

(73) Assignee: AT&T Corp., New York, NY (US)

( * ) Notice: Subject to any disclaimer, the term of this patent is extended or adjusted under 35 U.S.C. 154(b) by 640 days.

(21) Appl. No.: 10/055,104

(22) Filed: Jan. 23, 2002

(51) Int. Cl.
*H04Q 7/20* (2006.01)

(52) U.S. Cl. .................. 455/456.1; 455/410; 455/411; 455/414.1; 455/456.2; 455/456.3; 455/456.5; 455/456.6; 455/457

(58) Field of Classification Search ............. 455/456.1, 455/456.2, 410, 411, 414.1, 456.3, 456.5, 455/456.6, 457
See application file for complete search history.

(56) References Cited

U.S. PATENT DOCUMENTS

| | | | |
|---|---|---|---|
| 5,311,569 A | 5/1994 | Brozovich et al. ............. 379/45 |
| 5,341,411 A | 8/1994 | Hashimoto ............... 379/88.19 |
| 5,521,969 A | 5/1996 | Paulus et al. .......... 379/142.02 |
| 5,771,283 A * | 6/1998 | Chang et al. .......... 379/142.01 |
| 6,032,042 A | 2/2000 | Kauppi ..................... 455/432.3 |
| 6,185,426 B1 * | 2/2001 | Alperovich et al. ..... 455/456.1 |
| 6,442,391 B1 * | 8/2002 | Johansson et al. ....... 455/456.2 |
| 6,662,014 B1 * | 12/2003 | Walsh ..................... 455/456.2 |
| 6,674,860 B1 * | 1/2004 | Pirila ......................... 380/247 |
| 6,675,017 B1 * | 1/2004 | Zellner et al. .......... 455/456.1 |
| 7,085,555 B2 * | 8/2006 | Zellner et al. .......... 455/414.1 |
| 2003/0016804 A1 * | 1/2003 | Sheha et al. .......... 379/201.06 |

* cited by examiner

*Primary Examiner*—Steve M. D'Agosta
(74) *Attorney, Agent, or Firm*—Hoffmann & Baron, LLP

(57) ABSTRACT

A system and method for providing for a wireless calling party to configure his or her wireless service on a call-by-call or on a permanent basis so that only those calls where the caller wants his or her location to be available carry location information. To enable the capability of blocking and/or altering location, the caller can pre-configure his or her service so that the location information of the wireless calling party is either altered or blocked to the called party on a permanent basis. The wireless caller can also select on a call-by-call basis to either alter or block the location information to the called party by entering a particular code prior to making a call. Furthermore, a wireless caller may also select to block the storage of location information in the network by entering a pre-defined number prior to making a call, which in turn can then be used to place the outgoing call.

12 Claims, 4 Drawing Sheets

SYSTEM AND METHOD FOR SELECTIVELY TRANSFERRING WIRELESS CALLER LOCATION INFORMATION

FIELD OF THE INVENTION

The invention relates to the field of caller identification, and more particularly to selectively transfer the location information of the wireless calling party.

BACKGROUND OF THE INVENTION

When a calling party places a wireless call, the approximate location of the calling party can be determined. Currently, the location of the particular cell from which the calling party placed the wireless call can be automatically determined and conveyed to a called party. More precise calling party location information is also available, especially once enhanced 911 (E911) systems are in place. In addition, some wireless telephones have integrated global positioning system (GPS) receivers, where the GPS receivers provide precise latitude and longitude (i.e., geocode) information, making location information readily available.

There are a number of mechanisms in place for conveying calling party location information along with a call, either to a network element or directly to the called party. While, on one hand, there are many situations in which a wireless calling party may want his or her location to be known, such as for medical emergencies, traffic accidents, etc., there are, on the other and, many situations where a wireless calling party may want to keep his or her location anonymous or alter his or her location information.

SUMMARY OF THE INVENTION

The present invention provides a method for allowing a wireless calling party to configure his or her wireless service on a call-by-call or on a permanent basis so that only those calls where the caller wants his or her location to be available carry location information. The wireless service can also be set up to alter the location information where the caller may want to substitute his or her location information with less detailed location information or incorrect location information.

In accordance with one embodiment of the present invention, the caller can pre-configure his or her service so that location information is not conveyed or altered with wireless calls on a permanent basis. In such a situation, the network blocks or alters the location information of all wireless calls to the called parties.

In a first alternate embodiment, a wireless calling party can select, on a call-by-call basis, to block or alter the location of the calls made by entering a particular code defined for this purpose before making the call. In such a situation the network blocks or alters the location information of selected wireless calls to called parties.

In a second alternate embodiment, a wireless calling party may not want his or her location to be even being stored in the wireless network, accessible to the public. In such a situation, the wireless calling party may place a call to a desired called party by first dialing a telephone number pre-defined by a wireless provider. The call received at the predefined telephone number may then be automatically forwarded to the desired called party. In this embodiment the network does not store the wireless calling party's location. Instead the location information is stored in a secured server with restricted access. Furthermore, billing for this call is done without using location information conveyed by the network.

DETAILED DESCRIPTION OF THE PREFERRED EMBODIMENT

Figure 1:
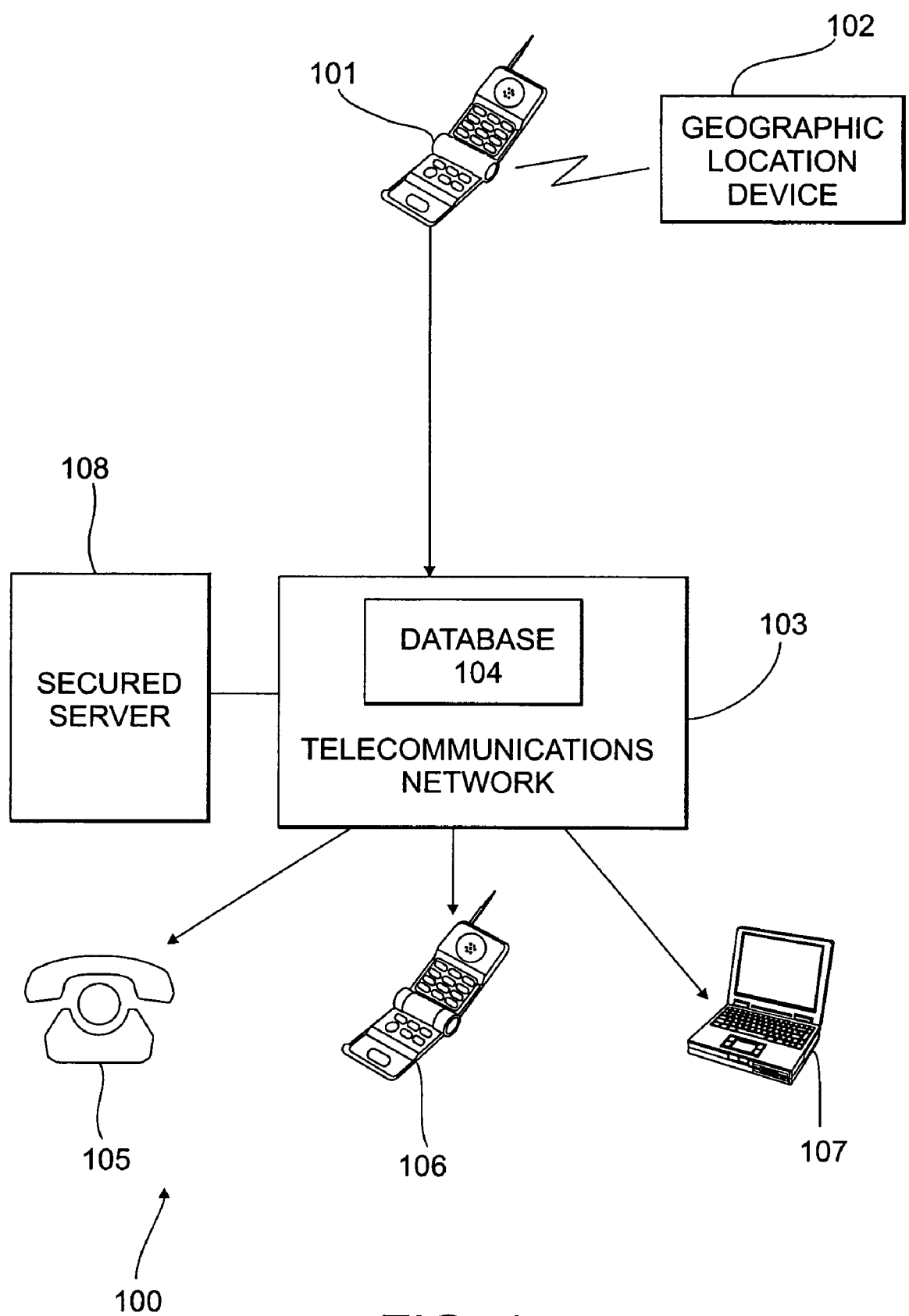
FIG. 1 is a block diagram illustrating the operation of selectively transferring location information of the wireless calling party to be transmitted to the called party.

With reference to FIG. 1 there is shown an illustrative block diagram of a network system 100 describing the operation of blocking wireless caller location information according to an embodiment of the present invention. The system 100 includes a wireless phone, 101, integrated with geographic location device 102, which provides the location information of the wireless phone 101. The geographic location device 102 can be of any type of device that determines the location of the wireless phone 101, such as enhanced 911 systems, global positional systems, etc. The location information accompanies the telephone call made by the wireless telephone 101 as shown in FIG. 1. The geographic location device 102 processing the location information can be processed within a communications network as shown in FIG. 1 or by processing by being co-located with the calling party.

The telephone call placed by the wireless phone 101 and the location information related to the call is received by a telecommunications network 103. After receiving the call and the location information, the telecommunications network 103 retrieves from a database 104, service information pre-established by the wireless calling party. Database 104 is a typical storage device capable of storing large amount of data. The service information specifies whether that wireless calling party wishes to convey the location information with the call. In the presently described embodiment, the service information may be customized by the wireless calling party on a permanent basis to block the transfer of the location information to the called party. Optionally, the service information established by the calling party can also be used to replace the location information with less detailed location data, which is supplied to the called party. For example, instead of conveying the entire street address with the building number, name of the town and or zip code, the system may only send the name of the state or the country to the called party. Also, the service information established by the wireless calling party can also specify to intentionally replace its location information with address information, which is an incorrect location of the wireless calling party. The address information is then placed in the location field and sent to the called party.

The service information may also specify blocking the identity of the wireless calling party such as telephone name and telephone number etc. Based on the service information pre-established by the wireless calling party from the database 104, the telecommunications network 103 determines whether to convey the location information of the wireless caller 101, to block the location information of the wireless caller 101 or substitute less specific information or incorrect address information. Thereafter, the telecommunications network 103 forwards the call to the called party with or without the location information, less specific location information, incorrect location information, etc. depending on the service information pre-established by the wireless calling party. If the location information is blocked, the location information may be replaced by "unknown location" or "location blocked", or some other similar message, and the called party will receive a display of the same.

The call with or without the location information, less specific location information or incorrect location information, received by the called party may be of several devices such as a regular phone 105, a cellular phone 106 or/and even further can be a personal computer 107. Similarly, as discussed earlier, the calling identification such as the wireless caller's name and telephone number may also be blocked with the call to the called party based on the wireless caller's service information.

The system in FIG. 1 as described above is based on preventing and/or altering the location information of the wireless calling party to be conveyed to the called party on a permanent basis. However, similarly, the intention as set forth in FIG. 1 is also capable of preventing the location information of the wireless calling party to be conveyed to the called party on a call-by-call basis. For instance, based on who the called party is, the wireless calling party may want to block the location information, allow the location information or alter the location information to be sent to the called party. Also, perhaps based on where the wireless party is calling from, he/she may or may not want to block the location information. In such situations, the telecommunications network 103 receives from the wireless phone 101, a telephone call with a string of numbers dialed by the wireless caller, accompanied by the location information of the wireless caller. The telecommunications network 103, in this case, checks the string of numbers to see if a code was entered prior to the telephone number of the called party. The code is an indication to either block the transfer of location information or alter the location information of the wireless caller to the called party. If the code is retrieved among the string of numbers entered by the calling party, the telecommunications network 103 forwards the call to the called party by either blocking the location information or altering the location information of the wireless phone 101. The code may additionally also specify blocking the identity of the wireless calling party such as telephone name and telephone number etc. So, similarly, the calling identification of the wireless caller may also be blocked with the call to the called party based on the wireless caller's code. In other words, the code may establish the level of type of information to be transferred to the called party.

Furthermore, the system of FIG. 1, is also capable of preventing the location information of the wireless calling party to be stored in the telecommunications network, which may be easily accessible to the public. In such a situation, the telecommunications network 103 receives from the wireless phone 101, a telephone call with a string of numbers dialed by the wireless caller, accompanied by the location information of the wireless caller. The telecommunications network 103, in this case, checks to see if a pre-defined number was entered prior to the telephone number of the called party. The pre-defined number is an indication to block the storage of location information of the wireless caller in the telecommunications network 103. This pre-defined number is used where the wireless caller 101 does not wish for the telecommunications network 103 to store the location information of the wireless caller 101 to its database 104. If the pre-defined number is retrieved, the telecommunications network 103 forwards the location information of the wireless caller 101 to a secured server 108. The secured server 108 simply stores the location information of the wireless caller 101. The secured server 108 may be of the type which is not accessible to the public and only accessible with restricted access to the very few who are given the authorization. Finally, the telecommunications network 103 forwards the call to the called party without conveying any location information of the wireless phone 101. The pre-defined number may additionally also specify blocking the storage of identity information of the wireless calling party to the database 104 of the telecommunications network 103. The identity information may be a telephone name and/or telephone number etc. So, similarly, the calling identification of the wireless caller can be additionally stored in the secured server 108 and the call is forwarded by the telecommunications network 103 to the called party without conveying the identity information of the wireless caller 101.

Figure 2:
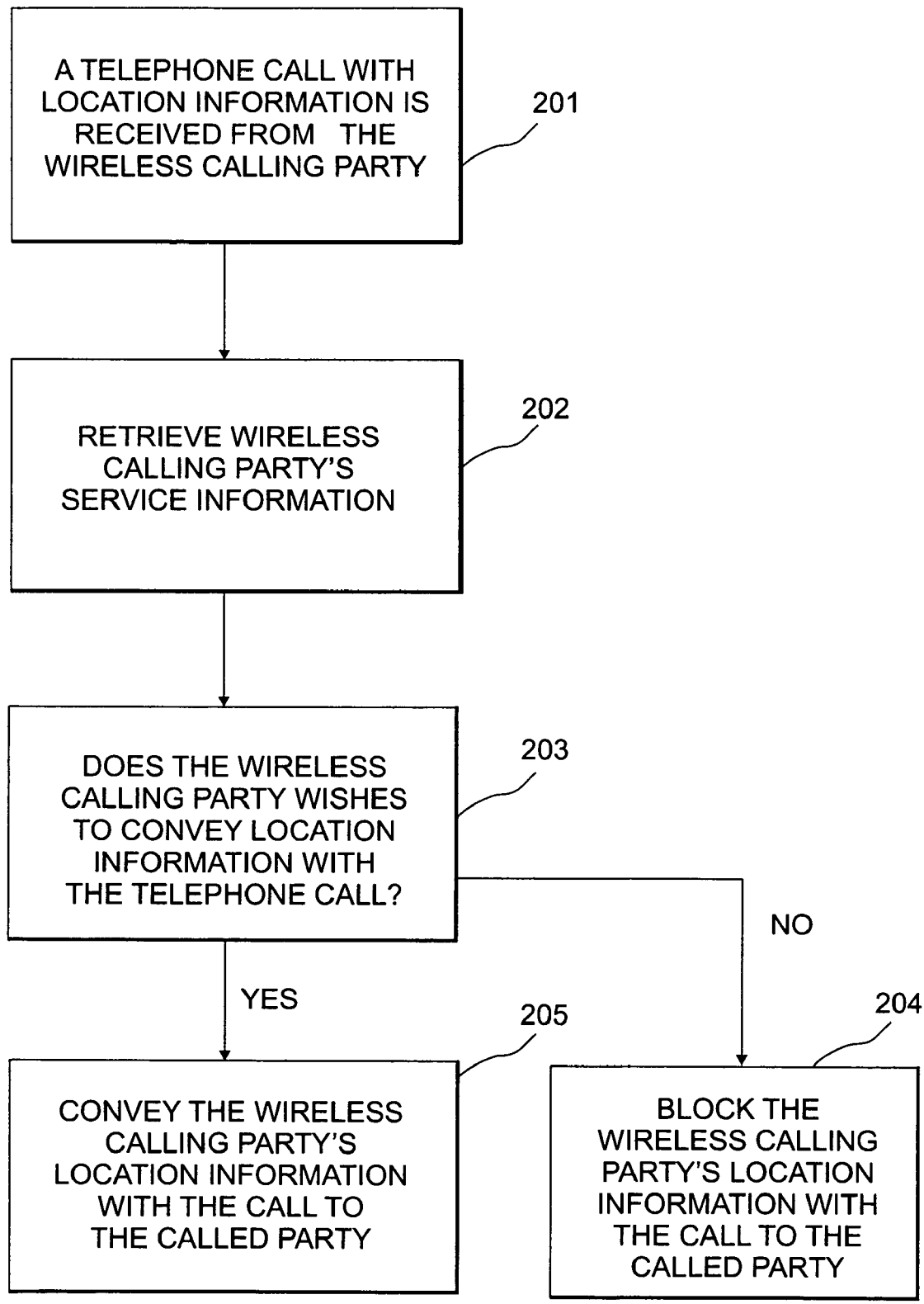
FIG. 2 is a flow diagram illustrating a method for preventing location of the wireless calling party to be transmitted to the called party on a permanent basis.
Figure 3:
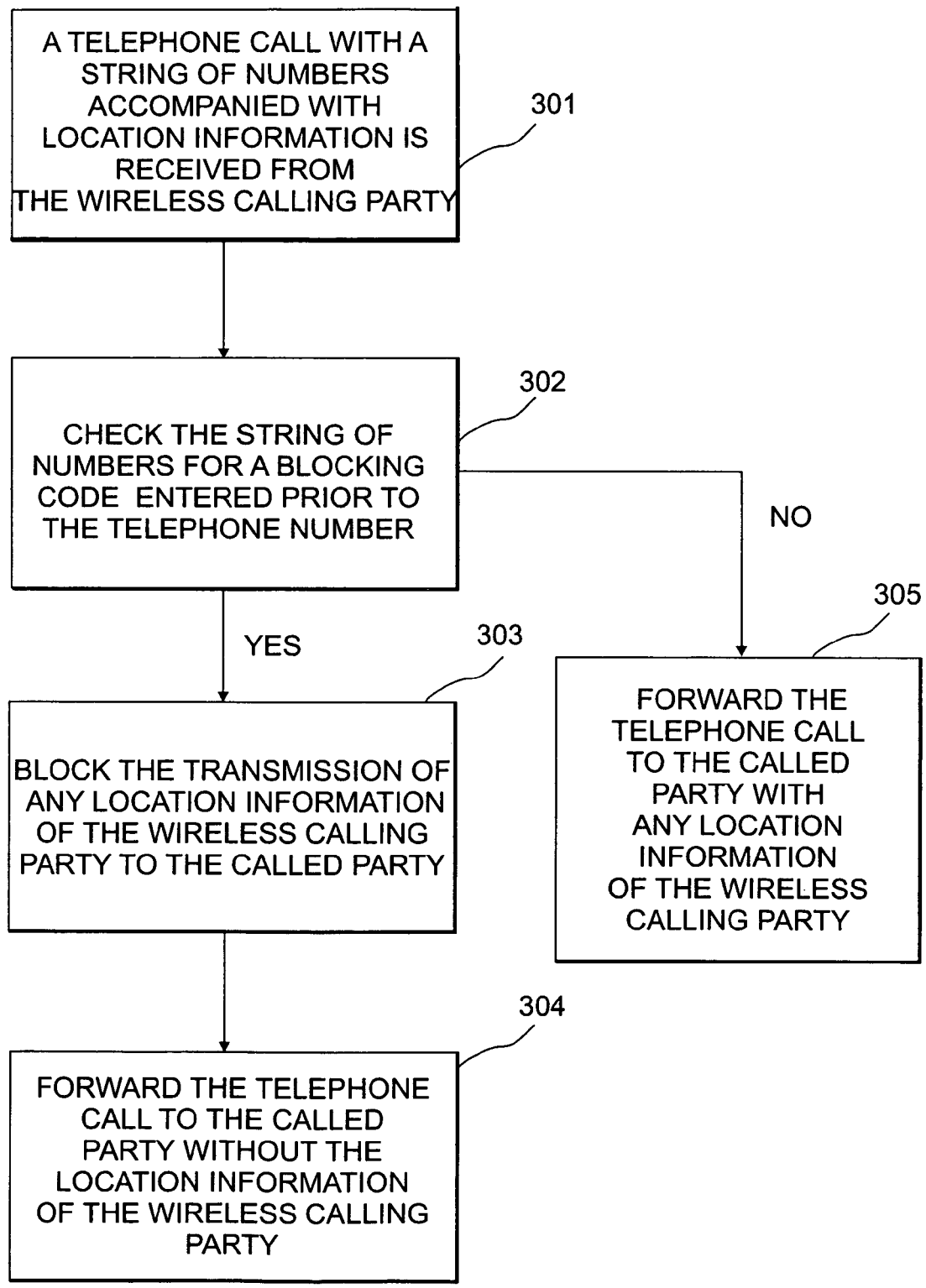
FIG. 3 is a flow diagram illustrating a method for preventing location of the wireless calling party to be transmitted to the called party on a call-by-call basis.

FIG. 2 is a flowchart illustrating one embodiment for preventing the location information of the calling party to be conveyed to the called party on a permanent basis. A telephone call accompanied by the location information from a wireless calling party is received at step 201. At step 202, the service information associated with the wireless calling party is retrieved. This service information is pre-configured or pre-established by the wireless calling party specifying whether that wireless calling party wishes to convey the location information with the call. In other words, the service information is customized by the wireless calling party on a permanent basis to block the transfer of the location information to the called party. The service information may additionally also specify blocking the identity of the wireless calling party such as name and telephone number etc. Furthermore, upon retrieval of the service information, at step 203, it is determined whether or not the service information includes instructions to convey the location information to the called party. If the wireless calling party service information includes instructions not to convey the location information, then at step 204, the location information of the wireless calling party is blocked with the call to the called party. On the other hand, if the service information does not include such instructions, then at step 205, the wireless calling party's location information is conveyed with the call to the called party. Also, as discussed above, other options such as disclosing a less specific data of the location information, replacing the location information with an address information, which is an incorrect location information, can also be utilized when forwarding the call to the called party, based on the service information pre-established by the wireless calling party. Also, as discussed above, the identity of the wireless calling party may optionally be also blocked with the call, based on the service information pre-established by the wireless calling party Now referring to FIG. 3, which shows an alternate embodiment for preventing the location information of the calling party to be conveyed to the called party on a call-by-call basis. A telephone call with a string of numbers dialed by the wireless calling party and accompanied by the location information is received at step 301. At step 302, the string of numbers are checked to see whether the wireless calling party entered a blocking code before the telephone number of the called party. The blocking code is an indication to block the transfer of the location information of the wireless calling party to the called party. The blocking code may additionally also specify blocking the identity of the wireless calling party such as name and telephone number etc. Upon retrieval of the blocking code, at step 303, the location information of the wireless calling party to the called party is blocked. Furthermore, at step 304, the telephone call is forwarded to the called party without conveying the location information of the wireless calling party. However, if at step 302, if it is determined that a blocking code is not entered before the telephone number of the called party, then at step 305, the telephone call is simply forwarded to the called party with any location information of the wireless calling party. Also, as discussed above, other options such as disclosing a less specific data of the location information, replacing the location information with an address information, which is an incorrect location information, can also be utilized when forwarding the call to the called party, based on the service information pre-established by the wireless calling party. As discussed above, the identity of the wireless calling party may optionally be also blocked to the called party, since the blocking code was entered before the telephone number by the wireless calling party.

Figure 4:
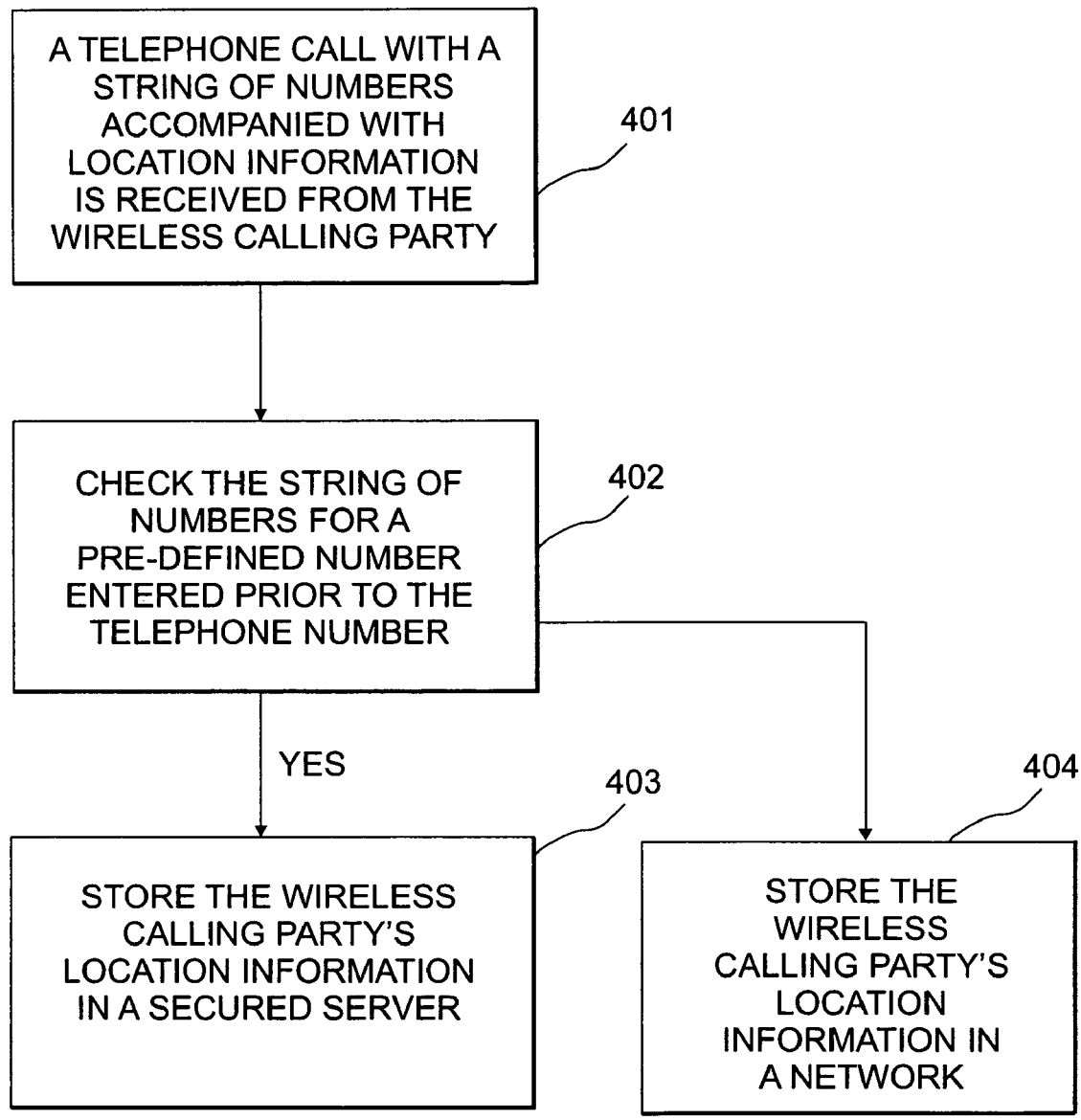
FIG. 4 is a flow diagram illustrating a method for preventing location of the wireless calling party to be stored in the network.

FIG. 4 shows a further alternate embodiment for preventing the location information of the wireless calling party to be stored in a network, which is easily accessible to the public. A telephone call with a string of numbers dialed by the wireless calling party and accompanied by the location information is received at step 401. At step 402, the string of numbers are checked to see whether the wireless calling party entered a pre-defined number before the telephone number of the called party. The pre-defined number is an instruction specifying storing the location information of the wireless calling party in a secure server with restricted access, rather than storing in a network that is easily accessible to the public. The pre-defined number is established by the wireless provider and provided to the wireless calling party upon request. The pre-defined number, additionally, also prevents the storage of the identification of the wireless calling party such as name and telephone number in a network easily accessible to the public. If it is determined at step 402 that a pre-defined number is entered by the wireless calling party, then, at step 403, the location information of the wireless calling party is stored in a secured server. However, if at step 402, if it is determined that a pre-defined number is not entered before the telephone number of the called party, then at step 404, the location information of the wireless calling party is stored in a network that is easily accessible to the public. As discussed above, the identity of the wireless calling party may optionally be also prevented from being stored in a network, and, rather stored in a secured server if the pre-defined number is entered before the telephone number by the wireless calling party.

While the invention has been described in relation to the preferred embodiments with several examples, it will be understood by those skilled in the art that various changes may be made without deviating from the spirit and scope of the invention as defined in the appended claims.

What is claimed is:

1. A method of selectively transferring location information of a wireless calling party to a called party, comprising:
    establishing predetermined parameters for the transfer of location information associated with said wireless calling party, wherein said predetermined parameters for the transfer of location information comprise preventing disclosure of the location information of the wireless calling party;
    receiving a telephone call at a telecommunications network from said wireless calling party comprising at least call information and location information;
    retrieving said predetermined parameters for the transfer of location information associated with said wireless calling party;
    transmitting said call information and said location information in accordance with said predetermined parameters for the transfer of location information of said wireless calling party to the called party; and
    forwarding the telephone call to the called party without disclosing the location information of the wireless calling party, the location information being replaced with a location blocked message, the location blocked message is displayed to the called party.

2. The method according to claim 1, wherein said predetermined parameters for the transfer of location information include disclosing less specific data of the location information.

3. The method according to claim 2, further comprising forwarding the telephone call to the called party with the less specific data of the location information of the wireless calling party.

4. The method according to claim 1, wherein said predetermined parameters for the transfer of location information includes instructions regarding replacing the location information with an address information.

5. The method according to claim 4, wherein the address information is different from the location information of the wireless calling party.

6. The method according to claim 4, wherein the address information is established by the wireless calling party.

7. The method according to claim 4, further comprises forwarding the telephone call to the called party with the address information.

8. A method according to claim 1, wherein said location information is received with the telephone call from the wireless calling party.

9. The method according to claim 1, wherein said predetermined parameters for the transfer of location information includes blocking the transmission of calling number identification of the wireless calling party.

10. The method according to claim 9, further comprising blocking the transmission of calling number identification of the wireless calling party to the called party.

11. The method according to claim 1, wherein said predetermined parameters for the transfer of location information include blocking the transmission of calling name identification of the wireless calling party.

12. The method according to claim 11, further comprising blocking the transmission of calling name identification of the wireless calling party to the called party.

* * * * *